Dec. 27, 1938.   R. A. BALFOUR ET AL   2,141,504

SAW TEETH

Filed June 9, 1937

INVENTORS
Robert A. Balfour
Frederick H. Hale

Patented Dec. 27, 1938

2,141,504

UNITED STATES PATENT OFFICE 2,141,504

SAW TEETH

Robert Arthur Balfour and Frederick Holyoake Hale, Wicker, Sheffield, England

Application June 9, 1937, Serial No. 147,377
In Great Britain October 20, 1936

3 Claims. (Cl. 143—133)

This invention relates to the form and construction of teeth for saws of almost any type and has as its object the provision of teeth which are progressively strengthened towards that end of the blade at which the cutting stroke commences so that the rate of wear is uniform throughout the length of the saw.

It has already been proposed to vary the tooth size and also the angle of rake of the teeth in different types of saws or saw blades by varying the pitch of the teeth at the same time, but the present invention has no concern with devices of those types.

According to the present invention therefore a saw or saw blade is provided having teeth, with a constant pitch progressively reduced in depth, and having the included angle comprising the cutting portion of the teeth progressively increased towards the end of the blade at which the cutting stroke commences.

The invention also comprises a saw blade having teeth with a constant pitch progressively reduced in depth and having the included angle, comprising the cutting portion of the teeth, progressively increased towards the end of the blade at which the cutting commenced and having angles of inclination of the leading edge to the vertical, variable.

In order that the invention may be more clearly understood and carried into effect the same will now be more particularly described with reference to the accompanying drawing in which:—

Figure 1:
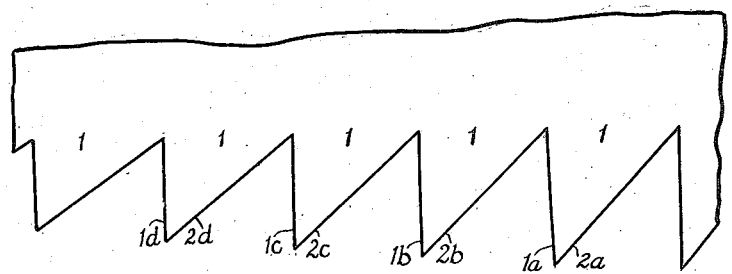
Fig. 1 illustrates one tooth form which is applicable to the invention.

In Fig. 1 (given as an example) the teeth 1 are shown as having a constant pitch both at their roots and tips and having parallel leading edges 1a, 1b, 1c, etc., of different lengths. Thus as the length of the leading edge of the tooth is varied, the size of the included angles 2a, 2b, 2c, etc., will vary inversely. Thus as the tooth becomes smaller the cutting point formed by the included angle becomes less and less acute and correspondingly more able to resist shock. Conversely as the tooth becomes larger, the angle forming the cutting point becomes more and more acute with the result that the point becomes better able to remove metal on its cutting stroke at a high rate of working.

The teeth are shown as progressively varying in size, but it should be noted that it may be found more convenient to arrange the teeth in groups of different sizes, the size of one group changing abruptly to the size of an adjacent one.

Figure 2:
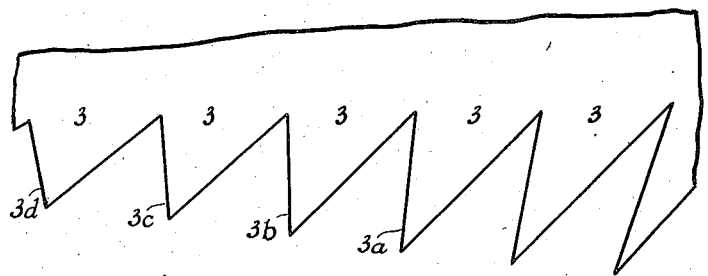
Fig. 2 illustrates a slightly modified tooth form which also pertains to the invention.
Figure 3:
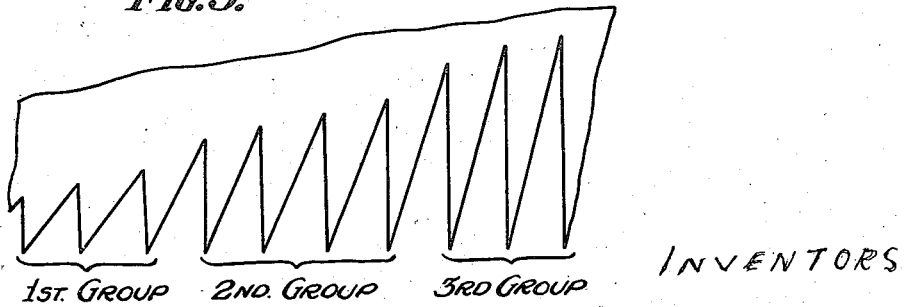
Fig. 3 is a view of part of a saw blade in which the teeth are arranged in groups of different sizes which change abruptly from one group to another.

In Fig. 2 (which shows another example) the teeth 3 are again shown as being of variable size whilst again having a constant pitch at their roots, but not at their tips or cutting points. This is due to the fact that the leading edges 3a, 3b, etc., are not parallel to each other as in the previous case but are inclined at progressively different angles to the vertical. Thus (Fig. 2) the smallest tooth has a leading edge 3d inclining away from the vertical passing through the root of the tooth at the leading edge and as the tooth increases in size the leading edge approaches more and more closely to a perpendicular position until finally the perpendicular position is passed and the leading edge slopes forwardly in the direction of cutting as shown by 3a. At the same time the included angle decreases in size as the tooth increases and the leading edge passes to a forward sloping position. The variation in slope of the leading edge may be a constant increase or decrease or may vary as some function of the size of the tooth or its included angle forming the cutting point.

As in Fig. 1, the variation in tooth size may be progressive or may vary abruptly by groups of teeth.

Two important results are obtained from a saw having teeth constructed according to the invention. The reduction in tooth depth, with consequent reduction in tooth size, has the effect of permitting the saw to commence its stroke with much less shock than if the commencing teeth were normal full size. This result is obtained by reason of the fact that the shorter teeth do not "dig in" to the work so much as larger teeth would at the commencement of the working stroke of the saw when the rate of movement is slow. This result is assisted by the fact that since the included angle referred to above is greater in the small teeth than in the larger, by reason of the shorter leading tooth face, the cutting effect will be reduced and easier movement of the saw is obtained.

The second result obtained is that since the force of impact on each tooth at the commencement of the stroke is reduced, there is less risk of fracture so that the life of the teeth and consequently of the saw or saw blade, is prolonged.

Whilst this invention is applicable to almost every type of saw or saw blade, yet its greatest application is probably in connection with hacksaw blades, including both manually and mechanically actuated types, which types are subjected to an unusually severe kind of treatment during service.

The progressive reduction in depth of teeth may commence at any point on the saw or over its whole length, and may be progressive to any desired proportion of the whole depth of the teeth.

Any form of tooth may be reduced in accordance with the principle described and this may be done irrespective of any preferred type of relief or set or clearance of such teeth.

We claim:

1. Saw or saw blade having teeth with a constant pitch, said teeth being progressively reduced in depth, and having the included angle comprising the cutting portion of the teeth progressively increased towards the end of the blade at which the cutting stroke commences.

2. Saw or saw blade having teeth with a constant pitch, said teeth being progressively reduced in depth, and having the included angle comprising the cutting portion of the teeth progressively increased towards the end of the blade at which the cutting stroke commences and having the angles of inclination of the leading edges to the vertical, variable.

3. Saw or saw blade as in claim 1 in which the teeth are arranged in groups of different sizes, the size of one group changing abruptly to the size of an adjacent one.

ROBERT ARTHUR BALFOUR.
FREDERICK HOLYOAKE HALE.